United States Patent
Mori et al.

(10) Patent No.: US 9,576,726 B2
(45) Date of Patent: Feb. 21, 2017

(54) ELECTRONIC EQUIPMENT, MODULE, AND SYSTEM

(75) Inventors: Masashi Mori, Sendai (JP); Koichi Mishina, Sendai (JP); Yuichi Hosokawa, Sendai (JP); Koji Sato, Sendai (JP)

(73) Assignee: NEC TOKIN CORPORATION, Sendai-Shi, Miyagi (JP)

( * ) Notice: Subject to any disclaimer, the term of this patent is extended or adjusted under 35 U.S.C. 154(b) by 684 days.

(21) Appl. No.: 13/976,886

(22) PCT Filed: Dec. 26, 2011

(86) PCT No.: PCT/JP2011/080010
§ 371 (c)(1),
(2), (4) Date: Jun. 27, 2013

(87) PCT Pub. No.: WO2012/090904
PCT Pub. Date: Jul. 5, 2012

(65) Prior Publication Data
US 2013/0270924 A1    Oct. 17, 2013

(30) Foreign Application Priority Data

Dec. 27, 2010  (JP) ................................. 2010-289054
Jul. 14, 2011  (JP) ................................. 2011-155646

(51) Int. Cl.
H01F 27/42    (2006.01)
H01F 37/00    (2006.01)
(Continued)

(52) U.S. Cl.
CPC ............... *H01F 38/14* (2013.01); *H02J 17/00* (2013.01)

(58) Field of Classification Search
CPC ............ H01F 38/14; H02J 17/00; H02J 7/025; H02J 17/005
(Continued)

(56) References Cited

U.S. PATENT DOCUMENTS

2010/0142423 A1* 6/2010 Zhu .................... H02J 17/00
                                                            370/311
2010/0171369 A1* 7/2010 Baarman ............ G06K 19/0707
                                                            307/104
(Continued)

FOREIGN PATENT DOCUMENTS

JP        11-145811 A       5/1999
JP   WO 2010035546 A1 *    4/2010   .............. H02J 5/005
(Continued)

OTHER PUBLICATIONS

International Search Report (ISR) dated Mar. 13, 2012 issued in International Application No. PCT/JP2011/080010.

*Primary Examiner* — Rexford Barnie
*Assistant Examiner* — Rasem Mourad
(74) *Attorney, Agent, or Firm* — Holtz, Holtz & Volek PC

(57) ABSTRACT

An electronic equipment is provided with an antenna including a coil, a load, a power feeding unit for feeding power received by the antenna to the load, a communication unit for communicating with the outside world via the antenna, a switching circuit installed between the antenna and the communication unit, and a switching control unit for controlling ON/OFF of the switching circuit according to power to be received by the antenna.

13 Claims, 6 Drawing Sheets

(51) Int. Cl.
  *H01F 38/00* (2006.01)
  *H01F 38/14* (2006.01)
  *H02J 17/00* (2006.01)

(58) Field of Classification Search
  USPC .......................................................... 307/104
  See application file for complete search history.

(56) References Cited

U.S. PATENT DOCUMENTS

| | | | | |
|---|---|---|---|---|
| 2011/0065398 A1* | 3/2011 | Liu | ......................... | H02J 5/005 |
| | | | | 455/127.1 |
| 2011/0115303 A1* | 5/2011 | Baarman | .................. | H02J 17/00 |
| | | | | 307/104 |
| 2011/0204723 A1* | 8/2011 | Irish | ......................... | H02J 17/00 |
| | | | | 307/104 |
| 2011/0210620 A1* | 9/2011 | Shinoda | .................. | H02J 5/005 |
| | | | | 307/104 |
| 2011/0217927 A1* | 9/2011 | Ben-Shalom | ........... | H02J 7/025 |
| | | | | 455/41.1 |

FOREIGN PATENT DOCUMENTS

| | | |
|---|---|---|
| JP | 2010-130835 A | 6/2010 |
| WO | WO 2010/035546 A1 | 4/2010 |

* cited by examiner

ELECTRONIC EQUIPMENT, MODULE, AND SYSTEM

TECHNICAL FIELD

This invention relates to an electronic device or a module, which comprises an antenna shared by communication and power reception in a non-contact electric power transmission. Furthermore, this invention relates to a system comprising the electronic device or the module.

BACKGROUND ART

One of systems with the electronic device of the type is, for example, disclosed in Patent Document 1. In a secondary device of Patent Document 1, one of a radio communication portion and a power reception portion is selectively coupled, by a switch, to an antenna consisting of a single coil.

PRIOR ART DOCUMENTS

Patent Document(s)

Patent Document 1: JP 2010-130835A

SUMMARY OF INVENTION

Technical Problem

The system of Patent Document 1 has a problem that a primary device cannot freely control timings of power transmission and communication.

It is therefore an object to provide an electronic device (secondary device) which has a structure allowing a primary device to freely control timings of power transmission and communication.

Solution to Problem

One aspect of the present invention provides an electronic device comprising: an antenna having a coil; a load; a power supply portion for supplying the load with an electric power received at the antenna; a communication portion for communicating with an outside of the communication portion through the antenna; a switch circuit provided between the antenna and the communication portion; and a switch controller for controlling, in response to an electric power received at the antenna, On state/Off state of the switch circuit.

Another aspect of the present invention provides a module comprising: an antenna; a power supply portion, coupled with a load, for supplying the load with an electric power received at the antenna; a communication portion for communicating with an outside of the communication portion through the antenna; a switch circuit provided between the antenna and the communication portion; and a switch controller for controlling, in response to an electric power received at the antenna, On state/Off state of the switch circuit.

Yet another aspect of the present invention provides a system comprising: the electronic device; and a primary device which includes a circuit for transmitting an electric power for the electronic device and another circuit for communicating with the electronic device.

Advantageous Effects of Invention

The present invention controls whether the communication portion is connected to the antenna or is disconnected from the antenna, on the basis of the electric power received at the antenna. Thus, the present invention enables the secondary device to substantially judge a power transmission period (power reception period) or a communication period on the basis of the received power. Therefore, the primary device can carry out power transmission and communication at any timings.

The present invention can prevent excess electric power from being supplied for the communication portion upon the power transmission. In other words, the present invention can properly protect the communication portion upon the power transmission. There is no need on redundant design of the communication portion in consideration of withstanding capability upon power reception, so that the communication portion with general structure can be used.

An appreciation of the objectives of the present invention and a more complete understanding of its structure may be had by studying the following description of the preferred embodiment and by referring to the accompanying drawings.

DESCRIPTION OF EMBODIMENTS

Figure 1:
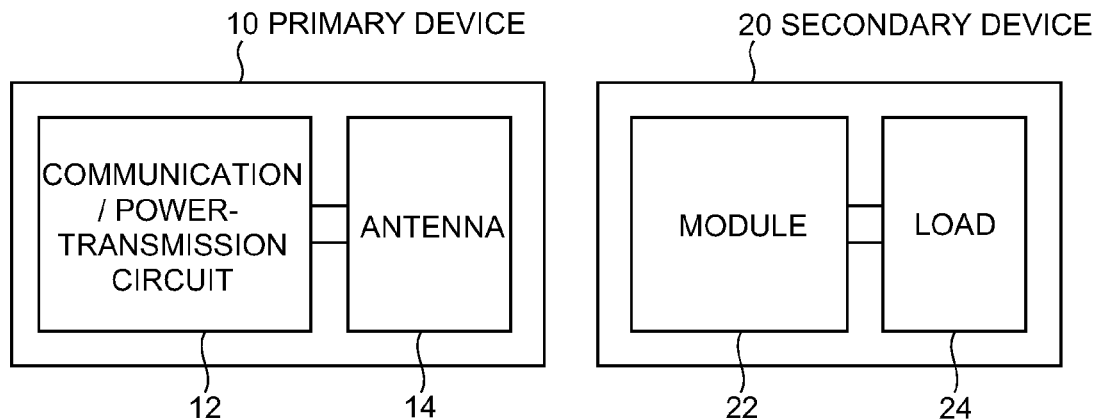
FIG. 1 is a block diagram schematically showing a system which comprises a primary device and a secondary device (electronic device) in accordance with a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

[First Embodiment]

With reference to FIG. 1, a system according to a first embodiment of the present invention comprises a primary device 10 and a secondary device (electronic device) 20.

As shown in FIG. 1, the primary device 10 generally comprises a communication/power-transmission circuit 12 and an antenna 14. The communication/power-transmission circuit 12 is capable of selectively controlling communication and power transmission freely. The communication/power-transmission circuit 12 communicates with the secondary device 20 through the antenna 14 upon communication, while transmitting an electric power to the secondary device 20 through the antenna 14 upon power transmission. For example, the communication/power-transmission circuit 12 comprises a circuit for communication, a circuit for power transmission and a control portion, wherein the circuit for communication includes a communication portion and a matching circuit for communication, the circuit for power transmission includes a power transmission portion and a matching circuit for power transmission, and the control portion controls at least the communication portion and the power transmission portion. In general, the antenna 14 is formed by a coil (coil antenna). The coil forming the antenna 14 may be separated for the circuit for communication and the circuit for power transmission. Namely, two or more coils may be used therefor. The coil forming the antenna 14 may be shared by the circuit for communication and the circuit for power transmission. Namely, only one coil may be used therefor.

In this embodiment, a frequency of an electric power wave used in electric power transmission and another frequency of a carrier wave used in communication belongs to 13.56 MHz bands and are equal to each other. An antenna power of an electric wave transmitted upon electric power transmission is 5 W or more, while another antenna power upon communication is 1 W or less. Namely, an antenna power of an electric wave transmitted upon electric power transmission is larger than another antenna power upon communication. Although a carrier wave frequency upon electric power transmission and another carrier wave frequency upon communication may be different from each other, it is preferable that both carrier wave frequencies are equal to each other, taking it into consideration that a use of a single antenna is efficiently shared by communication and electric power transmission in the secondary device 20 with simple control as explained afterwards.

As shown in FIG. 1, the secondary device 20 according to the present embodiment comprises a module 22 and a load 24 coupled to the module 22. Specifically, the load 24 of the present embodiment is a battery. Generally, the module 22 has a function to communicate with the primary device 10 and another function to receive an electric power from the primary device 10 to supply it for the load 24 (i.e., to put a battery on charge). In this embodiment, it is assumed that the load 24 be coupled to the module 22 by using a connector or the like upon fabrication of the secondary device 20. However, the present invention is not limited thereto. For example, the secondary device 20 may be fabricated by coupling the load 24 directly to a circuit board on which a function similar to the function of the module 22 is installed.

Figure 2:
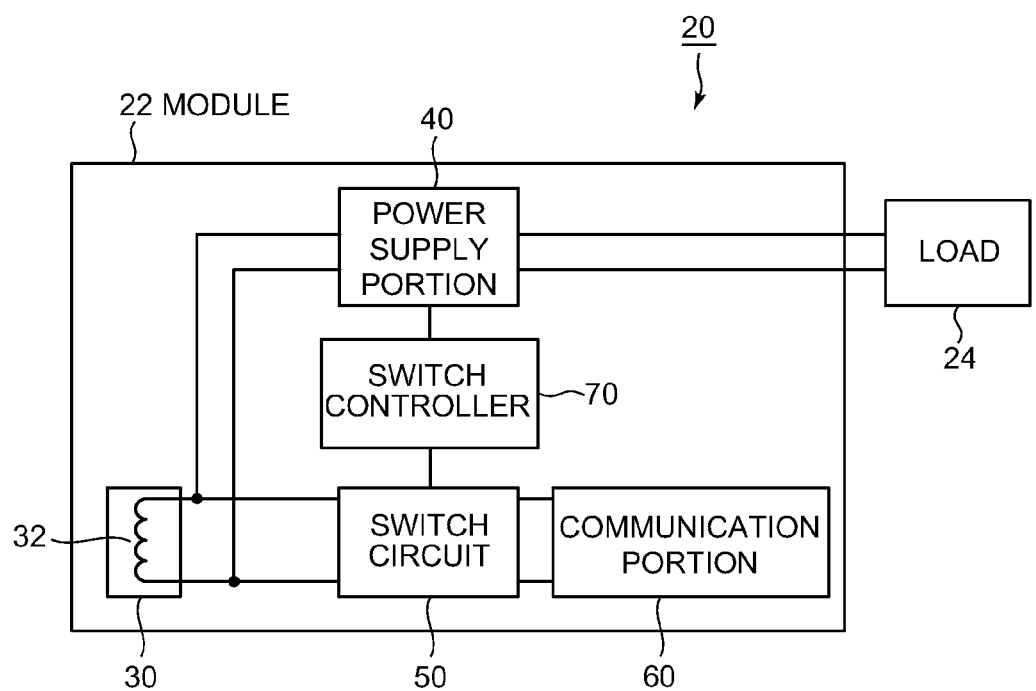
FIG. 2 is a block diagram schematically showing the secondary device (electronic device) of FIG. 1.

As shown in FIG. 2, the module 22 of the secondary device 20 according to the present embodiment comprises an antenna 30, a power supply portion 40, a switch circuit 50, a communication portion 60, and a switch controller 70, wherein the antenna 30 has a coil 32, the power supply portion 40 is connected to the antenna 30 and the load 24, the switch circuit 50 is connected to the antenna 30, the communication portion 60 is connected to the switch circuit 50, and the switch controller 70 is connected to the power supply portion 40 and the switch circuit 50. For example, the actual secondary device 20 is provided with a matching circuit for electric power supply and so prior to the power supply portion 40 and another matching circuit for communication and so on prior to the switch circuit 50. However, those are omitted for the sake of better understanding of the present embodiment.

The antenna 30 is for supplying the power supply portion 40 with an alternating power which is an electric power transmitted from the primary device 10 through magnetic coupling. The antenna 30 is also used to communicate with the primary device 10. Namely, the use of the antenna 30 according to the present embodiment is shared by electric power transmission and communication.

The power supply portion 40 is for supplying the load 24 with an electric power received at the antenna 30. For example, the power supply portion 40 comprises a rectifier and a DC/DC (direct current/direct current) converter, wherein the rectifier rectifies a received electric power of the antenna 30 to produce a rectification signal, and the DC/DC converter carries out DC/DC conversion on the rectification signal to supply the load 24 with the converted as a supply signal.

The switch circuit 50 is provided between the antenna 30 and the communication portion 60. The switch circuit 50 is for connecting between the antenna 30 and the communication portion 60 (On state) or for disconnecting the communication portion 60 from the antenna 30 (Off state) under control of the switch controller 70 as described later.

Figure 3:
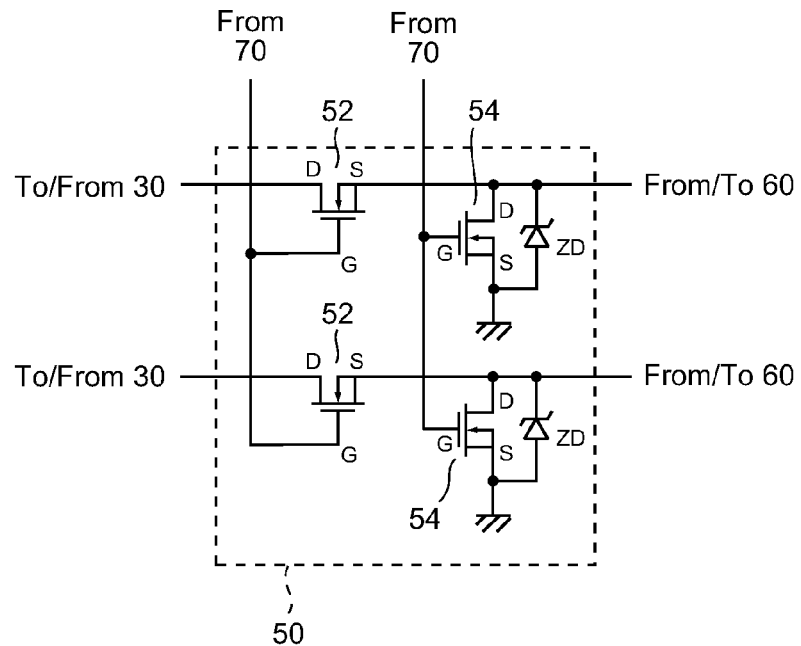
FIG. 3 is a diagram showing a concrete circuit structure of a switch circuit of FIG. 2.
Figure 4:
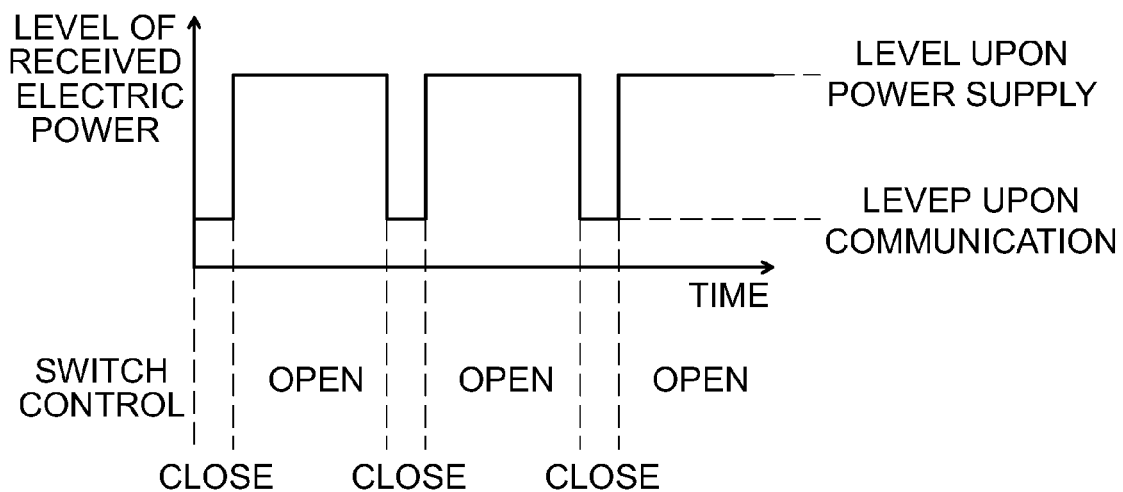
FIG. 4 is a diagram showing switch control of the secondary device (electronic device) of FIG. 2.

With reference to FIG. 3, the switch circuit 50 of the present embodiment comprises switches (unilateral switches) 52 and additional switches 54 and Zener diodes ZD, wherein the switches 52 are provided on two lines connected between the antenna 30 and the communication portion 60, respectively, the additional switches 54 are provided between a ground and the respective lines, and the Zener diodes ZD and the additional switches 54 are connected in parallel. Each of the switches 52 and the additional switches 54 according to the present embodiment is made of an Nch FET (field effect transistor). The drain of the FET forming the switch 52 is connected to one end of the coil 32 of the antenna 30, the source thereof is connected to the communication portion 60, and the gate thereof is connected to the switch controller 70. The drain of the FET forming the additional switch 54 is connected to a corresponding one of the lines, the source thereof is connected to the ground, and the gate thereof is connected to the switch controller 70. Each Zener diode ZD has a cathode connected to a corresponding one of the lines and an anode connected to the ground.

By using the switch circuit 50 with the aforementioned structure, it is possible that the antenna 30 and the communication portion 60 are connected, i.e., in the On state, when the switches 52 are turned on and the additional switches 54 are turned off, while the communication portion 60 is surely disconnected from the antenna 30, i.e., in the Off state, when the switches 52 are turned off and the additional switches 54 are turned on. In addition, because the Zener diodes ZD are provided, an input voltage to the communication portion 60 is prevented from exceeding a certain level even upon switching of the switch circuit 50, i.e., even upon transition from the On state to the Off state. As understood from the aforementioned matter, the Zener diodes ZD serve to add, to the switch circuit 50, an input protection function of the communication portion 60 as another function than the switching function. In other words, the Zener diodes ZD serve as an input protection portion that protects an input of the communication portion 60 in the switch circuit 50. The Zener diodes ZD may be omitted if the communication portion 60 itself has a structure tolerant to a temporal excess voltage.

With reference to FIG. 2 again, the communication portion 60 is for communicating with, i.e., transmitting into/receiving from, the primary device 10 through the antenna 30 when the switch circuit 50 is in the On state.

Figure 6:
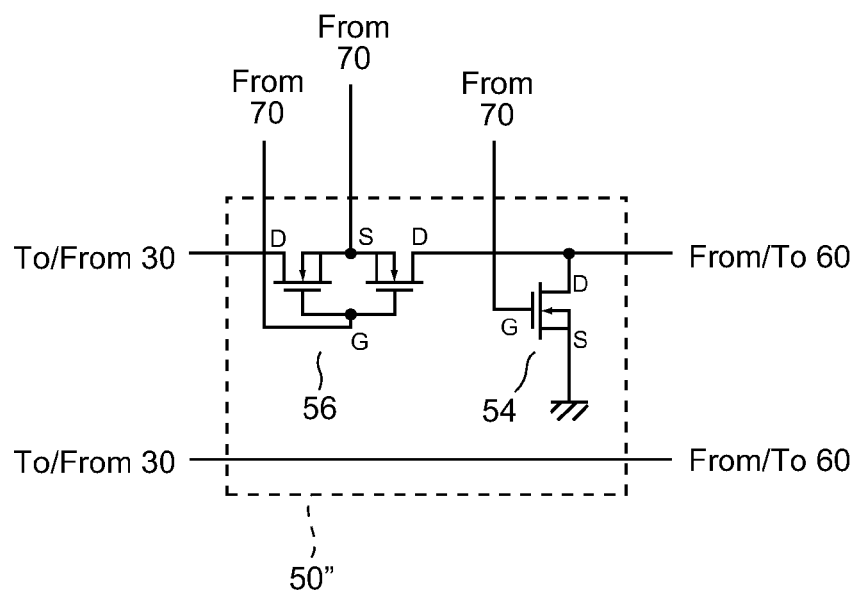
FIG. 6 is a diagram showing another modification of the switch circuit of FIG. 3.

The switch controller 70 is for controlling, in response to the received electric power of the antenna 30, the state of the switch circuit 50, i.e., whether the switch circuit 50 is in the On state or in the Off state. As described above, in this embodiment, an antenna power of an electric power wave transmitted from the primary device 10 upon electric power transmission is greater than another antenna power upon communication. Therefore, on the basis of the level of the received electric power of the antenna 30, the secondary device 20 can determine to take an electric power transmission mode when the electric level is high or to take a communication mode when the electric level is low. Specifically, as understood from FIGS. 2 and 6, the switch controller 70 determines, on the basis of the rectification signal received from the power supply portion 40, to let the switch circuit 50 take the Off state, i.e., electric power transmission mode, to disconnect the communication portion 60 from the antenna 30 if the received electric power level is high, or to let the switch circuit 50 take the On state, i.e., communication mode, to connect between the antenna 30 and the communication portion 60 so that the communication portion 60 carries out radio communication with the antenna 30, if the received electric power level is low. A threshold value used to carry out level judgment of the received electric power is properly set by a system. For example, the threshold value may be a single value or may have hysteresis which has a threshold value for transition from high received electric power to low received electric power and another threshold value for transition from low received electric power to high received electric power, both threshold values being different from each other.

The present embodiment switches the electric power transmission mode and the communication mode in response to the level of the received electric power so that the primary device can freely control whether it carries out electric power transmission or communication.

In this embodiment, the secondary device 20 changes the switch circuit 50 in the Off state to disconnect the communication portion 60 from the antenna 30 when being in the electric power transmission mode, so that the communication portion 60 can be protected from a high electric power transmitted from the primary device 10. Therefore, the communication portion 60 can has a general structure with no consideration of high electric power tolerance.

As apparent from the above-described embodiment, the switch circuit 50 is provided only between the antenna 30 and the communication portion 60 but not between the antenna 30 and the power supply portion 40. In other words, the secondary device 20 of the present embodiment includes the switch circuit 50 that disconnects the communication portion 60 from the antenna 30 under the electric power transmission mode, while including a structure that always connects between the power supply portion 40 and the antenna 30. As mentioned above, the power supply portion 40 of the present embodiment is connected to the antenna 30 even under the communication mode. Therefore, a circuit size of the switch circuit 50 can be made small, and the control of the switch circuit 50 becomes easy. In addition, the communication portion 60 can be supplied with an electric power by using the received electric power even upon the communication mode.

Figure 5:
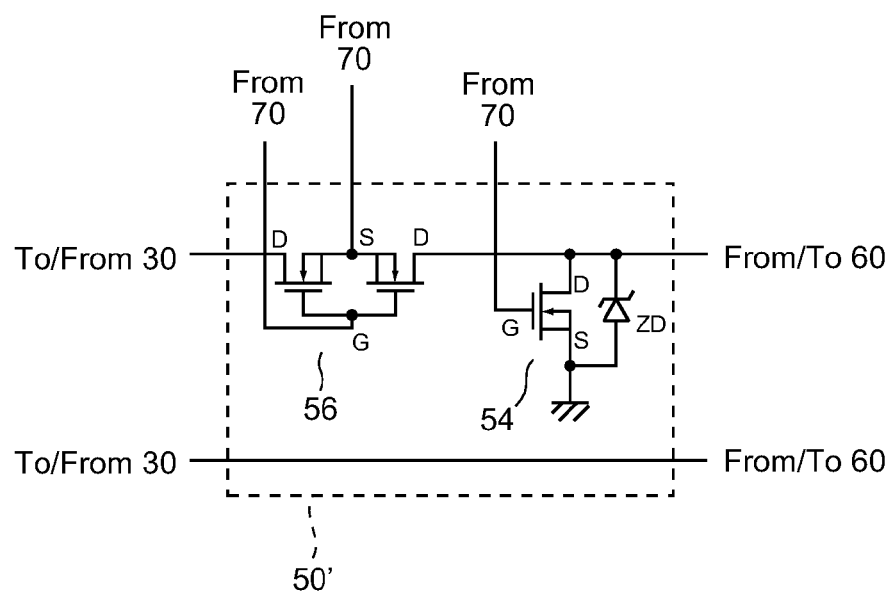
FIG. 5 is a diagram showing a modification of the switch circuit of FIG. 3.

The switch circuit 50 is not limited to the above-mentioned one but may be another one which can switch On/Off connection between the antenna 30 and the communication portion 60 under the control of the switch controller 70. For example, in the switch circuit 50 illustrated in FIG. 3, the switches (unilateral switches) 52 are provided on the respective lines. However, as the switch circuit 50' shown in FIG. 5, a bilateral switch 56 may be provided on one of the lines. The switch circuit 50' shown in FIG. 5 has the Zener diode ZD connected between the ground and the line on which the bilateral switch 56 is provided for input protection of the communication portion 60. However, as the switch circuit 50" shown in FIG. 6, the Zener diode ZD can be omitted. For either the switch circuit 50' of FIG. 5 or the switch circuit 50" of FIG. 6, the switch controller 70 controls the switch circuit 50' or the switch circuit 50" to change it to the On state under the communication mode by turning the bilateral switch 56 on and turning the additional switch 54 off. Under the electric power transmission mode, the switch controller 70 controls the switch circuit 50' or the switch circuit 50" to change it to the Off state under the electric power transmission mode by turning the bilateral switch 56 off and turning the additional switch 54 on.

Figure 7:
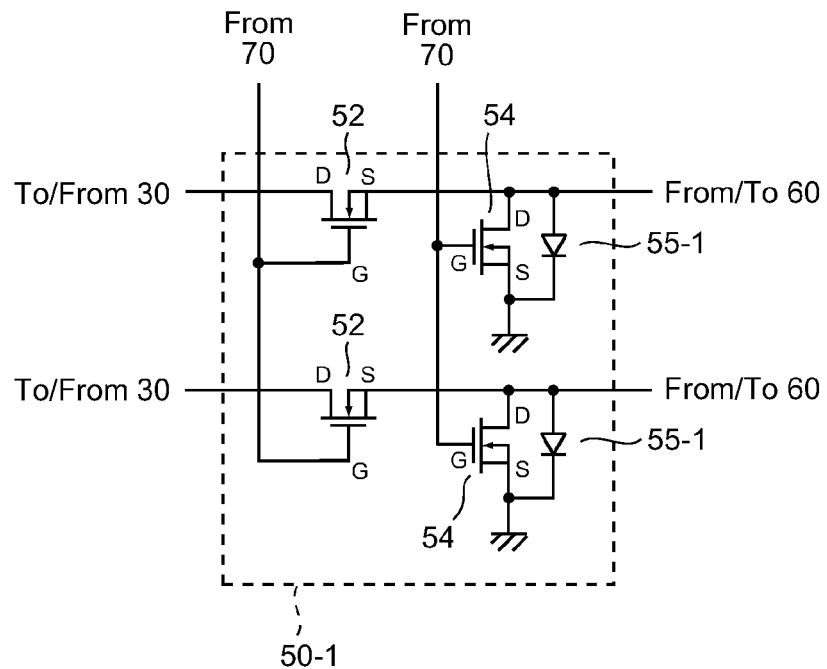
FIG. 7 is a diagram showing yet another modification of the switch circuit of FIG. 3.
Figure 8:
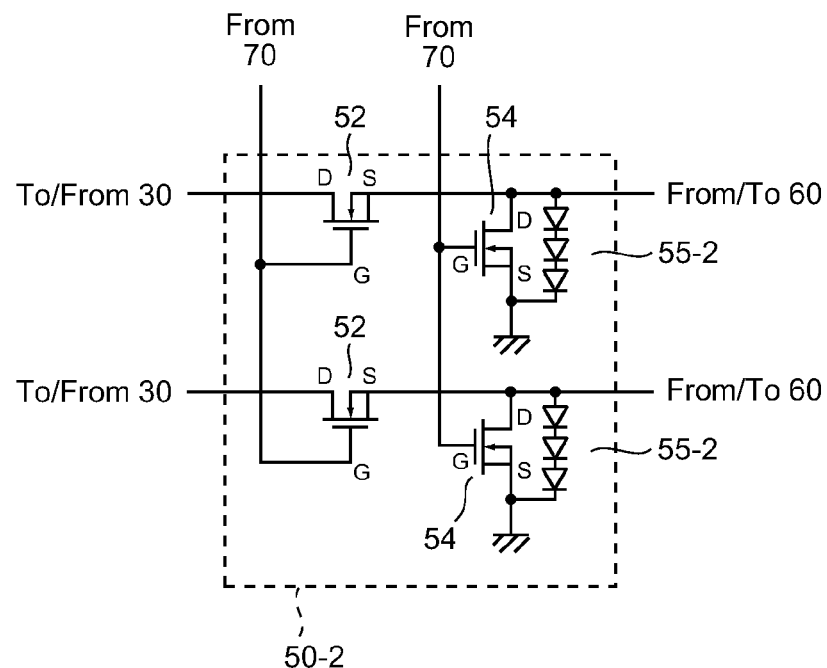
FIG. 8 is a diagram showing still another modification of the switch circuit of FIG. 3.

Furthermore, although the input protection portion protecting the input of the communication portion 60 in the aforementioned switch circuit 50 is formed of the Zener diodes, the present invention is not limited thereto. For example, the switch circuit 50-1 shown in FIG. 7 comprises an input protection portion 55-1 formed of diodes. Anodes of the diodes forming the input protection portion 55-1 are connected to the lines, respectively. Cathodes of the diodes are connected to the ground. With this structure, if voltages equal to or more than the forward voltages Vf of the diodes are applied to the respective lines, the diodes are turned on so that the communication portion 60 is protected. As the switch circuit 50-2 shown in FIG. 8, an input protection portion 55-2 may be formed by connecting a plurality of diodes in series. As illustrated in the drawing, anodes of the diodes forming one ends of the in-series connected diodes are connected to the lines, respectively, while cathodes of the diodes forming the other ends of the in-series connected diodes are connected to the ground. If the input protection portion 55-2 is formed of the diodes same as each other, the operating voltage of the input protection portion 55-2 becomes a voltage determined by multiplying a forward voltage Vf of the diode by the number of the diodes (in-series number). If the input protection portion 55-2 is formed of the diodes which are of plural types, the operating voltage of the input protection portion 55-2 becomes a voltage determined by summing all forward voltages Vf of all diodes. Thus, if the input protection portion 55-2 is formed of the plurality of diodes, the operating voltage of the input protection portion 55-2 can be set strictly. If voltages applied to the lines are equal to or more than the thus set operating voltage, currents flow into the input protection portion 55-2 so that the communication portion 60 is protected. Consequently, even if the spread due to the angle of view of the imaging device 8 is taken into consideration, the field of view F of the imaging device 8 becomes a maximum of about 120 mm.

[Second Embodiment]

Figure 9:
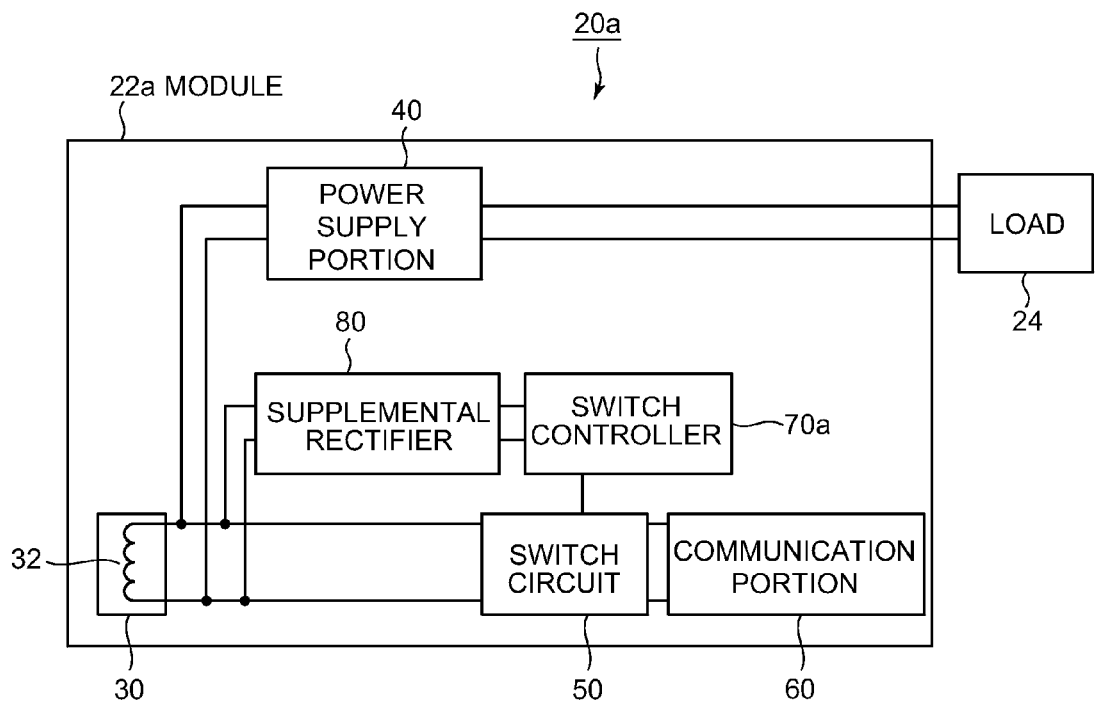
FIG. 9 is a block diagram schematically showing a secondary device (electronic device) in accordance with a second embodiment of the present invention.

With reference to FIGS. 2 and 9, a secondary device (electronic device) 20*a* according to a second embodiment of the present invention is a modification of the secondary device 20 according to the aforementioned first embodiment. Therefore, in FIG. 9, components similar to the components of FIG. 2 are depicted with reference numerals same as those of FIG. 2; explanations thereabout are omitted. Hereinafter, explanation will be mainly directed to its difference from the first embodiment.

As shown in FIG. 9, a module 22a of the secondary device 20a of the present embodiment comprises a supplemental rectifier 80 connected to both ends of the coil 32 of the antenna 30. A switch controller 70a of the present embodiment controls the switch circuit 50 not based on the rectification signal output from the power supply portion 40 but based on an output of the supplemental rectifier 80, so that the switch circuit 50 is in the Off state under the electric power transmission mode while is in the On state under the communication mode.

In the secondary device 20a of the present embodiment, the switch controller 70a controls the switch circuit 50 only on the basis of the output of the supplemental rectifier 80. The switch controller 70a may control the switch circuit 50 on the basis of both the output of the power supply portion 40 (rectification signal) and the output of the supplemental rectifier 80.

The switch circuit 50 is not limited to the structure shown in FIG. 3 but may be another structure if it can connect/disconnect between the antenna 30 and the communication portion 60 under the control of the switch controller 70a.

[Third Embodiment]

Figure 10:
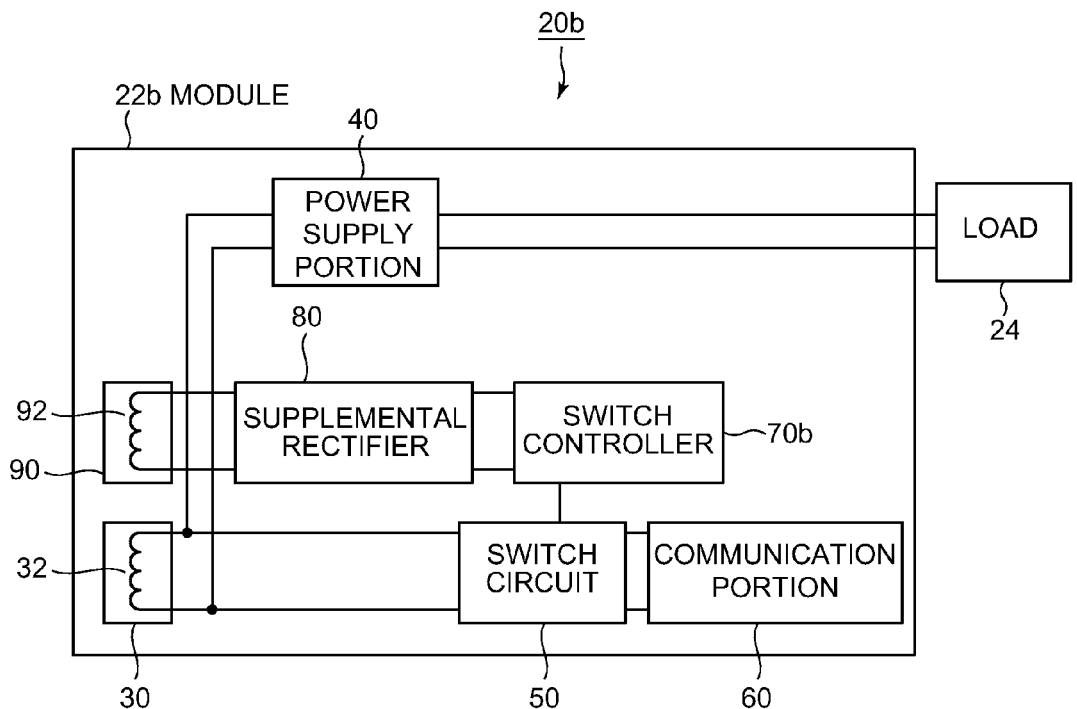
FIG. 10 is a block diagram schematically showing a secondary device (electronic device) in accordance with a third embodiment of the present invention.

With reference to FIGS. 2 and 10, a secondary device (electronic device) 20b according to a third embodiment of the present invention is a modification of the secondary device 20 according to the aforementioned first embodiment. Therefore, in FIG. 10, components similar to the components of FIG. 2 are depicted with reference numerals same as those of FIG. 2; explanations thereabout are omitted. Hereinafter, explanation will be mainly directed to its difference from the first embodiment.

As shown in FIG. 10, a module 22b of the secondary device 20b of the present embodiment comprises a supplemental antenna 90 having a supplemental coil 92 and a supplemental rectifier 80 connected to both ends of the supplemental coil 92. A switch controller 70b of the present embodiment controls the switch circuit 50 on the basis of the electric power received at the supplemental antenna 90 and rectified at the supplemental rectifier 80, so that the switch circuit 50 is in the Off state under the electric power transmission mode while is in the On state under the communication mode.

The switch circuit 50 is not limited to the structure shown in FIG. 3 but may be another structure if it can connect/disconnect between the antenna 30 and the communication portion 60 under the control of the switch controller 70b.

[Fourth Embodiment]

Figure 11:
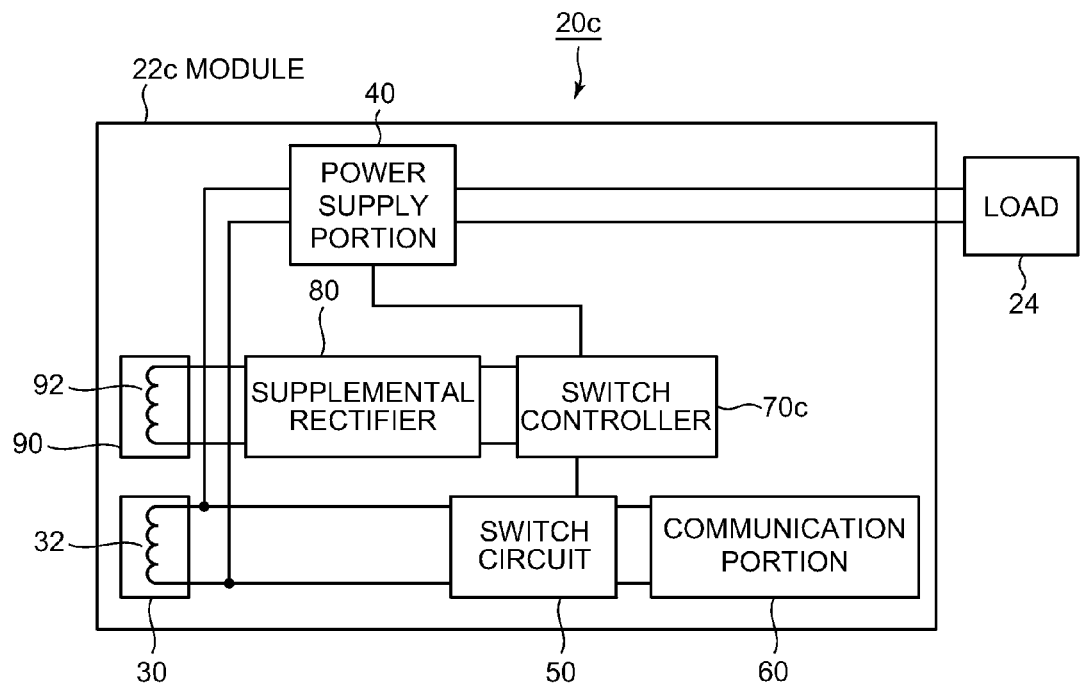
FIG. 11 is a block diagram schematically showing a secondary device (electronic device) in accordance with a fourth embodiment of the present invention.

With reference to FIGS. 10 and 11, a secondary device (electronic device) 20c according to a fourth embodiment of the present invention is a modification of the secondary device 20b according to the aforementioned third embodiment. Therefore, in FIG. 11, components similar to the components of FIG. 10 are depicted with reference numerals same as those of FIG. 10; explanations thereabout are omitted. Hereinafter, explanation will be mainly directed to its difference from the third embodiment.

As shown in FIG. 11, a switch controller 70c of a module 22c of the secondary device 20c of the present embodiment controls the switch circuit 50 on the basis of not only the output of the supplemental rectifier 80 but also the output of the power supply portion 40 (rectification signal) and the output of the supplemental rectifier 80. The system preferably sets how the switch controller 70c uses two outputs, i.e., the output of the supplemental rectifier 80 and the output of the power supply portion 40. For example, the switch controller 70c may control the switch circuit 50 so that the state of the switch circuit 50 is changed if any one of the output of the supplemental rectifier 80 and the output of the power supply portion 40 exceeds a predetermined threshold value. Or, the switch controller 70c may control the switch circuit 50 so that the state of the switch circuit 50 is changed only if both the output of the supplemental rectifier 80 and the output of the power supply portion 40 exceed a predetermined threshold value. The threshold values used for judgments of the outputs of the supplemental rectifier 80 and the power supply portion 40 may be different from each other.

The switch circuit 50 is not limited to the structure shown in FIG. 3 but may be another structure if it can connect/disconnect between the antenna 30 and the communication portion 60 under the control of the switch controller 70c.

[Fifth Embodiment]

Figure 12:
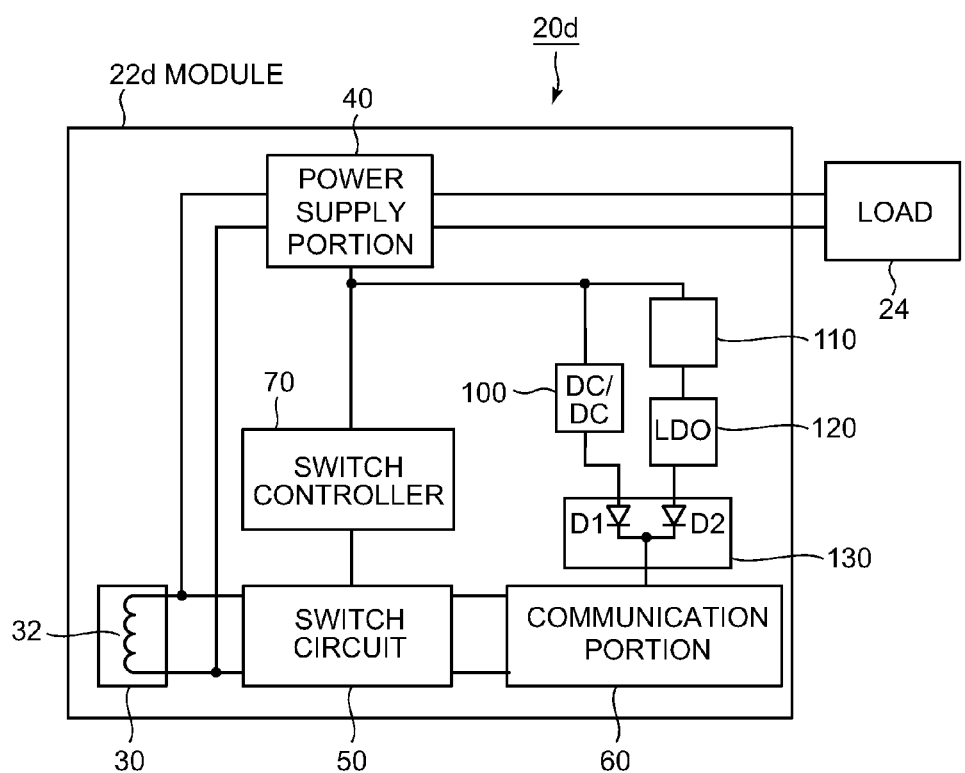
FIG. 12 is a block diagram schematically showing a secondary device (electronic device) in accordance with a fifth embodiment of the present invention.

With reference to FIGS. 2 and 12, a secondary device (electronic device) 20d according to a fifth embodiment of the present invention is a modification of the secondary device 20 according to the aforementioned first embodiment. Therefore, in FIG. 12, components similar to the components of FIG. 2 are depicted with reference numerals same as those of FIG. 2; explanations thereabout are omitted. Hereinafter, explanation will be mainly directed to its difference from the first embodiment.

As shown in FIG. 12, a module 22d of the secondary device 20d according to the present embodiment further comprises a DC/DC converter 100, a level detector 110, an LDO (Low Drop Output) regulator 120 and a supply circuit 130, wherein the DC/DC converter 100 is connected to the power supply portion 40, the level detector 110 is connected to the power supply portion 40, the LDO regulator 120 is connected to the level detector 110, and the supply circuit 130 is connected to the DC/DC converter 100 and the LDO regulator 120 and is also connected to the communication portion 60.

The DC/DC converter 100 receives the rectification signal from the power supply portion 40 and produces a first direct current signal to input the first direct current signal into the supply circuit 130. The level detector 110 receives the rectification signal and, if a level of the electric power received at the antenna 30 is lower than a predetermined level, inputs the rectification signal as a low electric power signal into the LDO regulator 120. When receiving the low electric power signal from the level detector 110, the LDO regulator 120 produces a second direct current signal to input the second direct current signal into the supply circuit 130. The supply circuit 130 comprises a first diode D1 and a second diode D2, wherein an anode of the first diode D1 is connected to the DC/DC converter 100 while a cathode of the first diode D1 is connected to the communication portion 60, and an anode of the second diode D2 is connected to the LDO regulator 120 while a cathode of the second diode D2 is connected to the communication portion 60. In other words, the first direct current signal is input into the anode of the first diode D1, while the second direct current signal is input into the anode of the second diode D2. The supply circuit 130 uses the first diode D1 and the second diode. D2 connected in Wired-OR configuration and supply the communication portion 60 with a higher one of the first direct current signal and the second direct current signal.

The above-described structure enables that the electric power received at the antenna 30 is efficiently supplied to the communication portion 60.

The above-described present invention is applicable to an electronic device such as a mobile phone or a digital camera which has a non-contact battery-charging function. Also, it is applicable to a system including the same.

The present application is based on Japanese patent applications of JP2010-289054 and JP2011-155646 filed before the Japan Patent Office on Dec. 27, 2010 and Jul. 14, 2011, respectively, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10 Primary Device
12 Communication/Power-Transmission Circuit
14 Antenna
20, 20a, 20b, 20c, 20d Secondary Device (Electronic Device)
22, 22a, 22b, 22c, 22d Module
24 Load
30 Antenna
32 Coil
40 Power Supply Portion
50, 50', 50" Switch Circuit
52 Switch (Unilateral Switch)
54 Additional Switch
ZD Zener Diode
56 Bilateral Switch
60 Communication Portion
70, 70a, 70b, 70c Switch Controller
80 Supplemental Rectifier
90 Supplemental Antenna
92 Supplemental Coil
100 DC/DC Converter (DC/DC)
110 Level Detector
120 LDO Regulator (LDO)
130 Supply Circuit
D1 First Diode
D2 Second Diode

The invention claimed is:

1. An electronic device comprising:
an antenna having a coil;
a load;
a power supply portion for supplying the load with an electric power received at the antenna, the power supply portion including a rectifier and a DC/DC converter, the rectifier rectifying a received electric power of the antenna to produce a rectification signal, the DC/DC converter carrying out DC/DC conversion on the rectification signal to supply the load with the converted rectification signal as the electric power;
a communication portion for communicating with an outside of the communication portion through the antenna;
a switch circuit provided between the antenna and the communication portion; and
a switch controller for controlling, on the basis of the rectification signal received from the rectifier of the power supply portion, the switch circuit to (i) disconnect the communication portion from the antenna so that the load is supplied with the electric power, if the received electric power level is high, and (ii) to connect between the antenna and the communication portion so that the communication portion carries out radio communication with the antenna, if the received electric power level is low.

2. The electronic device as recited in claim 1, wherein a frequency upon transmission of the electric power is equal to another frequency of a carrier wave of the communication.

3. The electronic device as recited in claim 1, further comprising a supplemental rectifier coupled with the antenna, wherein the switch controller controls the switch circuit in response to an output of the supplemental rectifier.

4. The electronic device as recited in claim 1, further comprising:
a supplemental antenna provided for detection of an electric power received at the antenna; and
a supplemental rectifier coupled with the supplemental antenna,
wherein the switch controller controls the switch circuit in response to an output of the supplemental rectifier.

5. The electronic device as recited in claim 3, wherein the switch controller also uses an output of the power supply portion to control the switch circuit.

6. The electronic device as recited in claim 1, wherein:
the antenna and the communication portion are connected by using a plurality of lines;
the switch circuit comprises switches, additional switches and Zener diodes, the switches being provided for the lines, respectively, the additional switches being provided between a ground and the lines, respectively, cathodes of the Zener diodes being connected to the lines, respectively, anodes of the Zener diodes being connected to the ground; and
the additional switches are controlled by the switch controller to take reversed states of the switches, respectively.

7. The electronic device as recited in claim 1, wherein:
the antenna and the communication portion are connected by using a plurality of lines;
the switch circuit comprises switches, additional switches and diodes, the switches being provided for the lines, respectively, the additional switches being provided between a ground and the lines, respectively, anodes of the diodes being connected to the lines, respectively, cathodes of the diodes being connected to the ground; and
the additional switches are controlled by the switch controller to take reversed states of the switches, respectively.

8. The electronic device as recited in claim 1, wherein:
the antenna and the communication portion are connected by using a plurality of lines;
the switch circuit comprises switches, additional switches and a plurality of sets of diodes connected in series, the switches being provided for the lines, respectively, the additional switches being provided between a ground and the lines, respectively;
anodes of the diodes constituting one ends of the in-series connected diodes are connected to the lines, respectively;
cathodes of the diodes constituting other ends of the in-series connected diodes connected to the ground; and the additional switches are controlled by the switch controller to take reversed states of the switches, respectively.

9. The electronic device as recited in claim 1, wherein:
the electronic device further comprises another DC/DC converter, a level detector, an LDO regulator and a supply circuit, the another DC/DC converter producing a first direct current signal in response to the rectification signal, the level detector receiving the rectification signal and, if a level of an electric power is lower than a predetermined level, outputting the rectification signal as a low electric power signal, the LDO regulator producing a second direct current signal in response to the low electric power signal, the supply circuit supplying the communication portion with one of the first direct current signal and the second direct current signal which is higher in voltage level.

10. The electronic device as recited in claim 9, wherein the supply circuit comprises a first diode and a second diode, an anode of the first diode being coupled with the another DC/DC converter, a cathode of the first diode being coupled with the communication portion, another anode of the second diode being coupled with the LDO regulator, another cathode of the second diode being coupled with the communication portion.

11. A module comprising:
an antenna;
a power supply portion, coupled with a load, for supplying the load with an electric power received at the antenna, the power portion including a rectifier and a DC/DC converter, the rectifier rectifying a received electric power of the antenna to produce a rectification signal, the DC/DC converter carrying out DC/DC conversion on the rectification signal to supply the load with the converted rectification signal as the electric power;
a communication portion for communicating with an outside of the communication portion through the antenna;
a switch circuit provided between the antenna and the communication portion; and
a switch controller for controlling, on the basis of the rectification signal received from the rectifier of the power supply portion, the switch circuit to (i) disconnect the communication portion from the antenna so that the load is supplied with the electric power, if the received electric power level is high, and (ii) to connect between the antenna and the communication portion so that the communication portion carries out radio communication with the antenna, if the received electric power level is low.

12. A system comprising:
the electronic device as recited in claim 1; and
a primary device which includes a circuit for transmitting an electric power for the electronic device and another circuit for communicating with the electronic device.

13. The electronic device as recited in claim 1, wherein the power supply portion is directly coupled to the antenna.

* * * * *